US008825345B2

(12) United States Patent
Ellis

(10) Patent No.: US 8,825,345 B2
(45) Date of Patent: Sep. 2, 2014

(54) ENGINE CONTROL FOR A MOTOR VEHICLE

(75) Inventor: Nathaniel Ellis, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 1055 days.

(21) Appl. No.: 12/837,848

(22) Filed: Jul. 16, 2010

(65) Prior Publication Data

US 2012/0016573 A1    Jan. 19, 2012

(51) Int. Cl.
*G06F 19/00* (2011.01)
*B60W 10/06* (2006.01)
*B60K 31/00* (2006.01)

(52) U.S. Cl.
CPC .......... *B60K 31/0008* (2013.01); *B60W 10/06* (2013.01); *Y02T 10/48* (2013.01); *B60K 2031/0033* (2013.01); *B60K 2031/0025* (2013.01)
USPC ...................... 701/112; 123/198 D

(58) Field of Classification Search
CPC ....... F02D 41/042; F02D 41/062; F02B 3/06; G06G 7/78; B60Q 1/525; B60K 28/16; G01S 13/931
USPC .............. 701/112, 113, 94, 96, 300, 301; 123/198 D, 198 DB, 198 DC; 340/435, 340/436, 903
See application file for complete search history.

(56) References Cited

U.S. PATENT DOCUMENTS

| | | | |
|---|---|---|---|
| 4,362,133 A | 12/1982 | Malik | |
| 4,364,343 A | 12/1982 | Malik | |
| 5,343,970 A | 9/1994 | Severinsky | |
| 5,904,215 A * | 5/1999 | Ikeda | 180/169 |
| 6,292,753 B1 * | 9/2001 | Sugimoto et al. | 701/301 |
| 6,330,508 B1 | 12/2001 | Akabori et al. | |
| 6,356,042 B1 | 3/2002 | Kahlon et al. | |
| 6,371,889 B1 | 4/2002 | Kuroda et al. | |
| 6,456,230 B2 * | 9/2002 | Schwartz et al. | 342/71 |
| 6,554,088 B2 | 4/2003 | Severinsky et al. | |
| 6,763,298 B2 | 7/2004 | Boggs et al. | |
| 6,941,198 B2 | 9/2005 | Brigham et al. | |
| 6,961,654 B2 | 11/2005 | Boggs et al. | |
| 6,966,867 B2 | 11/2005 | Tajima et al. | |
| 6,987,330 B2 | 1/2006 | Momcilovich et al. | |
| 7,104,347 B2 | 9/2006 | Severinsky et al. | |
| 7,110,877 B2 | 9/2006 | Ozeki et al. | |
| 7,237,634 B2 | 7/2007 | Severinsky et al. | |
| 7,392,871 B2 | 7/2008 | Severinsky et al. | |
| 7,412,310 B2 | 8/2008 | Brigham et al. | |
| 7,455,134 B2 | 11/2008 | Severinsky et al. | |
| 7,465,251 B2 | 12/2008 | Zhang | |
| 7,520,353 B2 | 4/2009 | Severinsky et al. | |
| 7,559,388 B2 | 7/2009 | Severinsky et al. | |
| 7,642,897 B2 * | 1/2010 | Karabinis | 340/10.3 |
| 8,068,036 B2 * | 11/2011 | Ghazarian | 340/903 |
| 2003/0144773 A1 | 7/2003 | Sumitomo | |

(Continued)

*Primary Examiner* — John Kwon
*Assistant Examiner* — Johnny Hoang
(74) *Attorney, Agent, or Firm* — Plumsea Law Group, LLC

(57) ABSTRACT

A control system for a motor vehicle is disclosed. The control system determines if a motor vehicle is going to stop according to information about a preceding vehicle. The control system may use information about the vehicle speed of the motor vehicle, a following distance between the motor vehicle and a preceding vehicle and preceding vehicle deceleration information. When the control system determines that the motor vehicle is going to stop, the motor vehicle shuts down the engine prior to the vehicle stopping in order to improve fuel efficiency and reduce emissions.

20 Claims, 6 Drawing Sheets

(56) References Cited

U.S. PATENT DOCUMENTS

| | | |
|---|---|---|
| 2004/0263099 A1 | 12/2004 | Maslov et al. |
| 2005/0052080 A1 | 3/2005 | Maslov et al. |
| 2006/0030997 A1* | 2/2006 | Ozeki et al. .................. 701/112 |
| 2006/0142121 A1* | 6/2006 | Moriya ......................... 477/199 |
| 2006/0289208 A1* | 12/2006 | Katsuhiro et al. ........... 180/65.2 |
| 2007/0075850 A1* | 4/2007 | Lucas et al. .................. 340/435 |
| 2007/0262749 A1* | 11/2007 | Luan et al. .................... 320/132 |
| 2008/0082247 A1 | 4/2008 | Hawkins et al. |
| 2008/0117079 A1 | 5/2008 | Hassan |
| 2009/0024264 A1 | 1/2009 | Aldrich, III et al. |
| 2009/0071733 A1 | 3/2009 | Duan et al. |
| 2009/0098976 A1 | 4/2009 | Usoro et al. |
| 2009/0143962 A1* | 6/2009 | Tong et al. .................... 701/112 |
| 2009/0150016 A1 | 6/2009 | Hung et al. |
| 2009/0150025 A1* | 6/2009 | Akahoshi et al. ............... 701/36 |
| 2009/0164109 A1* | 6/2009 | Maruyama .................... 701/116 |
| 2009/0177345 A1 | 7/2009 | Severinsky et al. |
| 2009/0199555 A1* | 8/2009 | Hatano ........................... 60/545 |
| 2009/0267517 A1* | 10/2009 | Tanaka et al. .................... 315/82 |
| 2010/0010723 A1* | 1/2010 | Taki et al. ...................... 701/102 |
| 2010/0114462 A1* | 5/2010 | Gibson et al. ................. 701/113 |
| 2011/0277728 A1* | 11/2011 | Schoenek et al. ............. 123/320 |

* cited by examiner

ENGINE CONTROL FOR A MOTOR VEHICLE

BACKGROUND

The present invention relates generally to a motor vehicle, and in particular to a method of controlling an engine in a motor vehicle.

Methods of controlling an engine in a hybrid vehicle have been previously proposed. In hybrid vehicles an engine and motor may be controlled to reduce fuel consumption and improve emissions. In some systems, an engine may be shut down when the vehicle is stopped.

The related art lacks provisions for efficiently reducing fuel consumption and reducing emissions.

SUMMARY

In one aspect, the invention provides a method of operating a motor vehicle including an engine, comprising the steps of: receiving vehicle speed information for the motor vehicle; receiving information related to a preceding vehicle, the preceding vehicle disposed approximately in front of the motor vehicle; determining if the motor vehicle is going to stop using the information about the preceding vehicle and the vehicle speed information; and controlling the engine to shut down if the motor vehicle is going to stop.

In another aspect, the invention provides a method of operating a motor vehicle including an engine, comprising the steps of: determining a following distance to a preceding vehicle; retrieving a threshold following distance; determining a vehicle speed of the motor vehicle; retrieving a threshold vehicle speed; and controlling the engine to shut down when the following distance is less than the threshold following distance and when the vehicle speed is less than the threshold vehicle speed.

In another aspect, the invention provides a method of operating a motor vehicle including an engine, comprising the steps of: receiving information related to a preceding vehicle; determining a vehicle speed of the motor vehicle; retrieving a threshold vehicle speed; determining if the preceding vehicle is decelerating; and controlling the engine to shut down when the vehicle speed is less than the threshold vehicle speed and when the preceding vehicle is decelerating.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
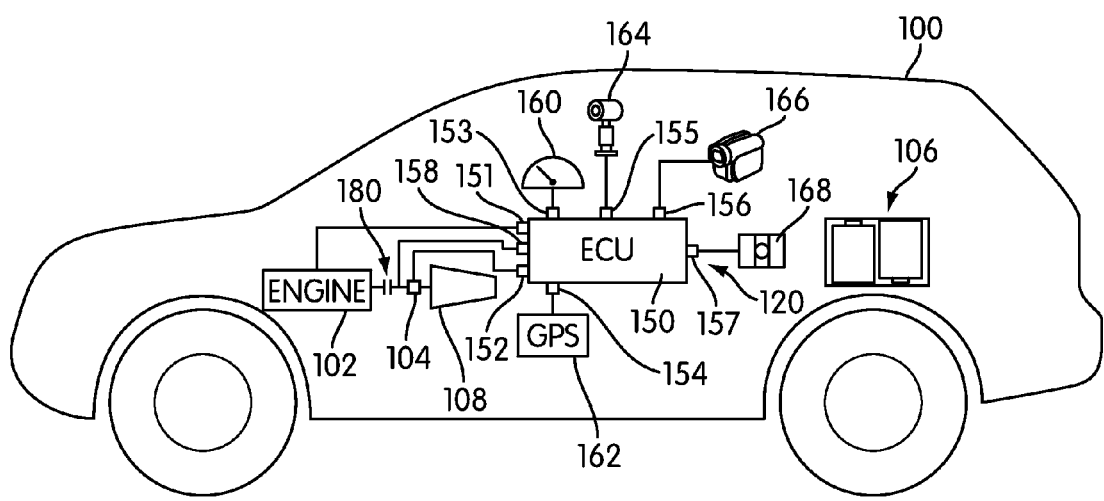
FIG. 1 is a schematic view of an embodiment of a motor vehicle including a control system.

FIG. 1 is a schematic view of an embodiment of a control system for a motor vehicle. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Referring to FIG. 1, motor vehicle 100 may be a hybrid vehicle. Generally, motor vehicle 100 may be any type of hybrid vehicle including, but not limited to: parallel hybrid, mild parallel hybrid, power-split series-parallel hybrid, series hybrid, plug-in hybrid electrical vehicle (PHEV), fuel cell electric hybrid as well as any other kind of hybrid. In one embodiment, motor vehicle 100 may be a parallel hybrid that supplies extra power to the power train through a motor in parallel relation to the engine.

In the current embodiment, motor vehicle 100 may include engine 102 that runs on combustible fuel. Motor vehicle 100 may also include electric motor 104 that is powered by battery assembly 106. Battery assembly 106 may comprise one or more rechargeable batteries that store electricity. Engine 102 and/or electric motor 104 may be configured to deliver power to one or more wheels of motor vehicle 100 through transmission 108.

In some embodiments, motor vehicle 100 can include provisions for decoupling engine 102 from motor 104 as well as transmission 108. Generally, any known method of disconnecting an engine and an electric motor could be used. In some embodiments, engine 102 and motor 104 could be connected by way of clutch assembly 180. Clutch assembly 180 may be any type of clutch assembly that allows for the connection or disconnection between engine 102 and motor 104. In particular, when clutch assembly 180 is engaged, torque may be transferred directly between engine 102 and motor 104. Also, when clutch assembly 180 is disengaged, torque may not be transferred between engine 102 and motor 104.

Generally, any type of clutch known in the art can be used with clutch assembly 180. For purposes of clarity, a particular embodiment of a clutch is illustrated in the Figures. However, in other embodiments, any other type of clutch could be used. Examples of different types of clutches that can be used with a clutch assembly include, but are not limited to: single plate friction clutches, multiple plate friction clutches, dry clutches, wet clutches, dog clutches, cone clutches, overrunning clutches, centrifugal clutches, hydraulic clutches and electromagnetic clutches, as well as any other types of clutches.

For purposes of clarity, only some components of motor vehicle 100 are shown in the current embodiment. Furthermore, it will be understood that in other embodiments some of the components may be optional. Additionally, it will be understood that in other embodiments, any other arrangements of the components illustrated here can be used for powering motor vehicle 100.

Motor vehicle 100 can include provisions for controlling engine 102 and/or electric motor 104. In some cases, motor vehicle 100 can including control system 120 that is configured to control one or more operations associated with engine 102. In addition, in some cases, control system 120 may be configured to control one or more operations associated with electric motor 104. However, it will be understood that in other embodiments, separate control systems may be used for controlling engine 102 and electric motor 104.

Control system 120 may include provisions for communicating, and in some cases controlling, the various components associated with motor vehicle 100. In some embodiments, control system 120 may be associated with a computer or similar device. In the current embodiment, control system 120 may include electronic control unit 150, hereby referred to as ECU 150. In one embodiment, ECU 150 may be configured to communicate with, and/or control, various components of motor vehicle 100. In an exemplary embodiment, ECU 150 may be configured to communicate with and/or control engine 102. For example, in some cases, ECU 150 may be configured to control fuel injectors, valves, throttle position, as well as other components associated with engine 102. In addition, in some cases, ECU 150 could also communicate with and/or control motor 104 to coordinate the generation of power by both engine 102 and electric motor 104. Furthermore, it should be understood that in some cases, ECU 150 could also be configured to communicate with and/or control various other systems associated with motor vehicle 100.

ECU 150 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 150 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 150 may include port 151 for communicating with and/or controlling engine 102. In particular, port 151 may be configured to provide communication with fuel injectors, electronically controlled valves, an electronically controlled throttle as well as other systems utilized for the operation of engine 102. For purposes of clarity, a single port is shown in the current embodiment for communicating with various systems of engine 102. However, in other embodiments, ECU 150 could include distinct ports for communicating with fuel injections, electronically controlled valves, an electronically controlled throttle as well as other systems associated with engine 102. Moreover, in some cases, various sensors associated with the operation of engine 102, including temperature sensors, crank angle sensors and other kinds of sensors may communicate with engine 102 through port 151 or additional ports not shown. With this arrangement ECU 150 can send various control signals to injectors, valves or other components of engine 102 to control the operation of engine 102.

In some embodiments, ECU 150 may also include port 152 for communicating with and/or controlling electric motor 104. For example, in some cases, ECU 150 may provide control signals that supply electricity to electric motor 104 from battery assembly 106. In other cases, ECU 150 may receive information related to the operation of electric motor 104 through port 152, including the speed of electric motor 104. It will be understood that in other embodiments, ECU 150 could include multiple ports for communicating with and/or controlling various distinct components of electric motor 104.

In some embodiments, ECU 150 may include port 158 for communicating with and/or controlling clutch assembly 180. In particular, ECU 150 may send control signals to operate clutch assembly 180 in either an engaged state or a disengaged state. The type of signal used to control clutch assembly 180 may depend on the type of clutch assembly used.

In some embodiments, control system 120 may include provisions for detecting information about motor vehicle 100. In some cases, control system 120 may include provisions for detecting information about the speed of motor vehicle 100. In one embodiment, control system 120 can include vehicle speed sensor 160 for detecting the speed of motor vehicle 100. In some cases, vehicle speed sensor 160 could be one or more wheel speed sensors. In other cases, vehicle speed sensor 160 could be configured to measure the speed of an input or output shaft of transmission 108 to determine the vehicle speed. In still other cases, vehicle speed sensor 160 could be any kind of vehicle speed sensor known in the art. In still another embodiment, vehicle speed may be estimated using GPS location information. For example, in one embodiment control system 120 may include GPS system 162 for detecting the position of motor vehicle 100. In some cases, the position information can be used to determine an approximate speed of motor vehicle 100.

In the current embodiment, ECU 150 may include port 153 for receiving vehicle speed information. In particular, ECU 150 may receive information from vehicle speed sensor 160 using port 153. In addition, ECU 150 may include port 154 for receiving position information. In particular, ECU 150 may receive position information from GPS system 162 using port 154. As discussed above, the position of motor vehicle 100 at various different times can be used to estimate the vehicle speed of motor vehicle 100.

In some embodiments, control system 120 includes provisions for detecting information related to nearby vehicles. For example, in some cases, control system 120 can include provisions for detecting the distance between motor vehicle 100 and a preceding vehicle. Moreover, in some cases, control system 120 can include provisions for detecting the speed and/or acceleration of one or more preceding vehicles. Additionally, in some cases, control system 120 can determine if a preceding vehicle is stationary. In other words, control system 120 may be configured to determine if a preceding vehicle is not moving.

Various types of systems and devices can be used for detecting relative position, speed and acceleration information about a preceding vehicle. In particular, various types of remote sensing technologies can be used including, but not limited to: cameras, radar, lidar as well as other types of remote sensing devices or technology (also referred to as forward sensing technology). In the current embodiment, control system 120 may include radar sensor 164, camera 166 and lidar 168. Generally, radar sensor 164 can be any type of radar device that is capable of detecting information about a preceding vehicle. Likewise, camera 166 could be any type of camera known in the art that can be used to determine relative location and speed information about a preceding vehicle. In some cases, camera 166 could be a digital camera. In some cases, camera 166 could be a video camera. Furthermore, lidar 168 can be any type of light detection and ranging optical device known in the art. Although only three types of forward sensing technologies are shown in the current embodiment, other embodiments could include any other forward sensing technologies as part of control system 120. Moreover, it will be understood that some embodiments may only incorporate a single forward sensing technology. For example, one embodiment may only include radar 164, while another embodiment may only include camera 166.

In the current embodiment, ECU 150 may include port 155 for receiving information from radar sensor 164. Also, ECU 150 may include port 156 for receiving information from camera 166. In addition, ECU 150 may include port 157 for receiving information from lidar 168. Using this arrangement, ECU 150 may receive information that can be used to determine the relative location of a nearby vehicle with respect to motor vehicle 100, as well as the speed and/or acceleration of the nearby vehicle.

Although the current embodiment uses forward sensing technologies to determine the relative location and speed/acceleration of nearby vehicles, in other embodiments information about nearby vehicles could be obtained through direct communication with the nearby vehicle. For example, in another embodiment, motor vehicle 100 may communicate with one or more nearby vehicles using a vehicle communications network, such as a DSRC network. In some cases, motor vehicle 100 may receive GPS location information from nearby vehicles over the DSRC network that can be used to determine relative position, speed and/or acceleration information of the nearby vehicle.

During normal operation of a hybrid vehicle, an engine may be shut down when a vehicle is stopped to conserve fuel and reduce emissions, since the motor may be able to power the vehicle at low speeds. A control system may include provisions for extending the amount of time that an engine is shut down in order to improve fuel efficiency and reduce emissions. In embodiments incorporating forward sensing technology, a control system can use information about a preceding vehicle to estimate the probability that the motor vehicle will be stopping. If it is likely that the motor vehicle will soon be stopping, because, for example, a preceding vehicle is stopping at an intersection, the control system may shut the engine down early in anticipation of the vehicle stopping.

The terms "engine shut down" or "engine deactivation" may refer to states of the engine in which the engine is no longer providing power to a vehicle. In some cases, fuel injectors may be deactivated. Additionally, one or more valves can be deactivated. In particular, in some cases, any of the processes normally associated with the operation of engine 102 may be stopped or temporarily suspended. In other cases, however, some engine processes may continue while others may be stopped.

In some embodiments, control system 120 could disconnect engine 102 from motor 104 and transmission 108 while engine shut down occurs. In particular, control system 120 may operate clutch assembly 180 in a disengaged state during engine shut down. This arrangement may help improve fuel economy during engine shut down since it allows more kinetic energy to be stored by motor 104 rather than using the energy to pump air through engine 102 and lose the energy to heat friction. It will be understood that in other embodiments, engine shut down may not be accompanied by disconnection of the engine and motor or transmission. Likewise, it is possible that an engine and a motor could be disconnected without shutting down an engine.

Figure 2:
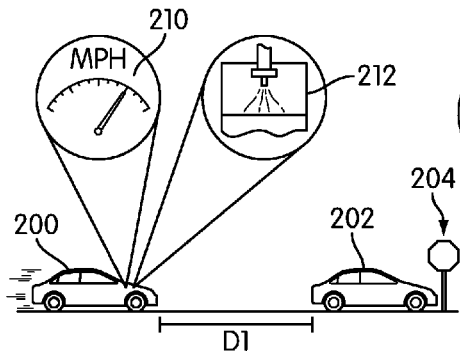
FIG. 2 is a schematic view of an embodiment of a motor vehicle traveling towards an intersection.
Figure 3:
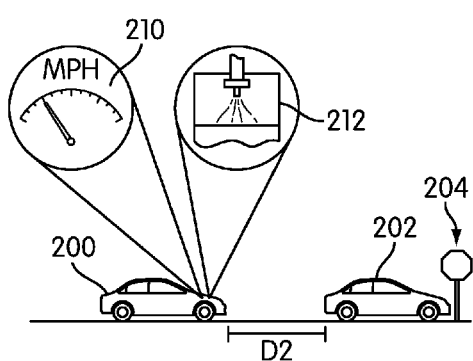
FIG. 3 is a schematic view of an embodiment of a motor vehicle traveling towards an intersection.
Figure 4:
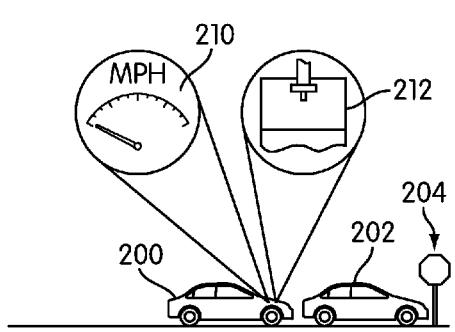
FIG. 4 is a schematic view of an embodiment of a motor vehicle stopped at an intersection.

FIGS. 2 through 4 illustrate an embodiment of the operation of a motor vehicle upon approaching an intersection where a preceding vehicle is already stopped. The term "preceding vehicle" as used throughout this detailed description and in the claims refers to any vehicle that is oriented in a direction that is approximately in front of a motor vehicle. Referring to FIGS. 2 through 4, motor vehicle 200 is traveling towards intersection 204. In this case, preceding vehicle 202 is already stopped at intersection 204. Initially, as seen in FIG. 2, motor vehicle 200 is a distance D1 away from preceding vehicle 202. At this point, the speed of motor vehicle 200, indicated schematically by speedometer 210, is relatively high. In addition, engine 212 is operating to power motor vehicle 200. At a later time, seen in FIG. 3, motor vehicle 200 has moved closer to preceding vehicle 202 and intersection 204. In particular, motor vehicle 200 is now distance D2 from preceding vehicle 202. Finally, as seen in FIG. 4, as motor vehicle 200 stops behind preceding vehicle 202, the vehicle speed is zero and engine 212 is shut down.

Figure 5:
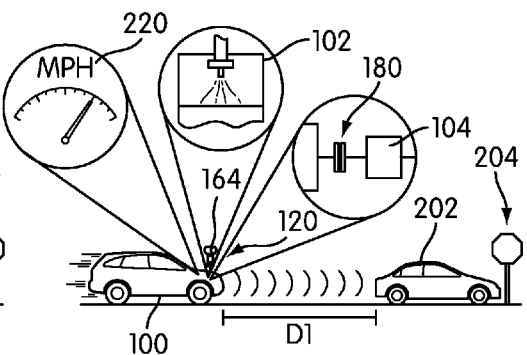
FIG. 5 is a schematic view of another embodiment of a motor vehicle traveling towards an intersection.
Figure 6:
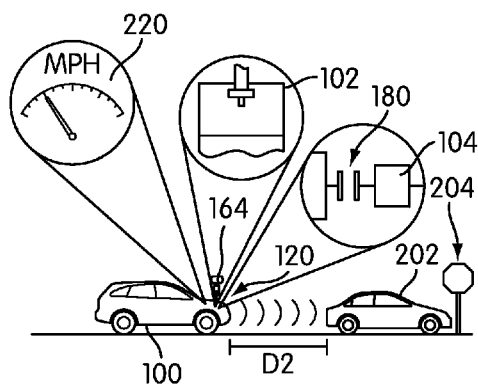
FIG. 6 is a schematic view of another embodiment of a motor vehicle traveling towards an intersection.
Figure 7:
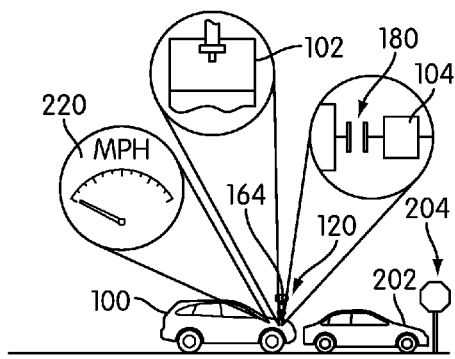
FIG. 7 is a schematic view of another embodiment of a motor vehicle stopped at an intersection.

FIGS. 5 through 7 illustrate another embodiment of the operation of a motor vehicle upon approaching an intersection where a preceding vehicle is already stopped. Referring to FIGS. 5 through 7, motor vehicle 100 is traveling towards intersection 204. In this case, preceding vehicle 202 is already stopped at intersection 204. Initially, as seen in FIG. 5, motor vehicle 100 is a distance D1 away from preceding vehicle 202. At this point, the speed of motor vehicle 100, indicated schematically by speedometer 220, is relatively high. In addition, engine 102 is operating to power motor vehicle 100. At this point, clutch assembly 180 is engaged so that torque is transferred between engine 102 and motor 104.

In contrast to the previous embodiment, motor vehicle 100 is capable of determining the distance between motor vehicle 100 and preceding vehicle 202 using radar sensor 164. For purposes of convenience, the distance between motor vehicle 100 and a preceding vehicle may sometimes be referred to as the following distance throughout this detailed description and in the claims. In FIG. 5, motor vehicle 100 determines that the following distance to preceding vehicle 202 is distance D1.

Referring now to FIG. 6, as motor vehicle 100 approaches preceding vehicle 202, control system 120 continues to determine the following distance to preceding vehicle 202. At this point, the following distance D2 is below a threshold following distance. Moreover, the vehicle speed is below a threshold vehicle speed. Therefore, control system 120 determines that it is likely that motor vehicle 100 will be stopping soon. In order to increase the amount of time that the engine is off, control system 120 shuts down engine 102 and decouples engine 102 from motor 102 and transmission 108. In one embodiment, clutch assembly 180 is disengaged so that engine 102 and motor 104 are disconnected. This arrangement helps increase the amount if energy stored by reducing pumping losses that would occur within engine 102. In addition, this arrangement lengthens the amount of time that fuel is conserved and emissions are reduced. Referring now to FIG. 7, as motor vehicle 100 stops behind preceding vehicle 202, engine 102 remains shut down. In some cases, as motor vehicle 100 begins to pull away from intersection 204, control system 120 may reactivate engine 102 to provide the necessary power for driving motor vehicle 100.

As seen by comparing FIGS. 2 through 4 with FIGS. 5 through 7, control system 120 provides a method of shutting down an engine before a vehicle has stopped or before a vehicle has slowed to a speed very close to 0. At high speeds, control system 120 may operate motor vehicle 100 in a similar manner to the operation of motor vehicle 200. However, as the following distance to a preceding vehicle falls below a threshold following distance and as the vehicle speed drops below a threshold speed, control system 120 shuts down engine 102 before motor vehicle 100 is stopped. Moreover, the engine shut down is initiated well in advance of the time at which engine shut down is initiated for the embodiment shown in FIGS. 2 through 4. In particular, the engine of motor vehicle 200 of the embodiment seen in FIGS. 2 through 4 runs until the vehicle speed is very close to or equal to 0. Using the exemplary embodiment shown in FIGS. 5 through 7 provides an increased duration for engine shut down and thereby provides greater fuel economy and reduced emissions.

Figure 8:
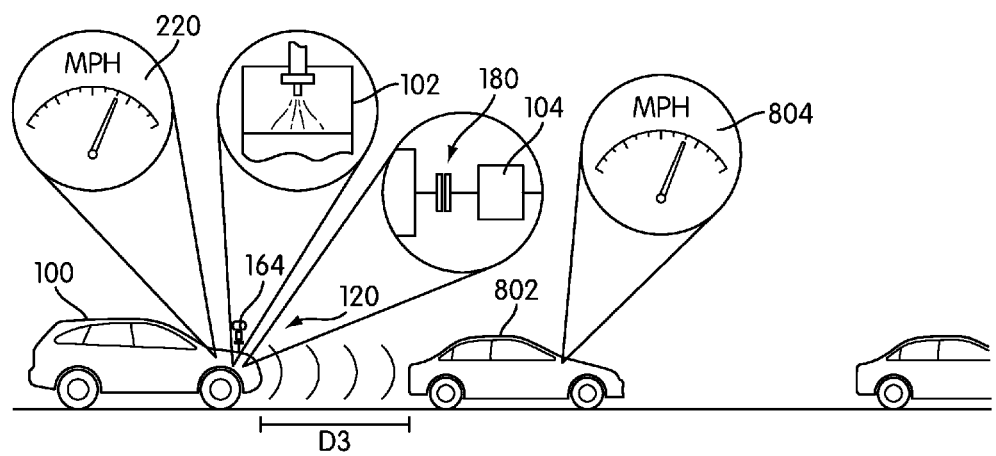
FIG. 8 is a schematic view of an embodiment of a motor vehicle traveling behind a preceding vehicle.
Figure 9:
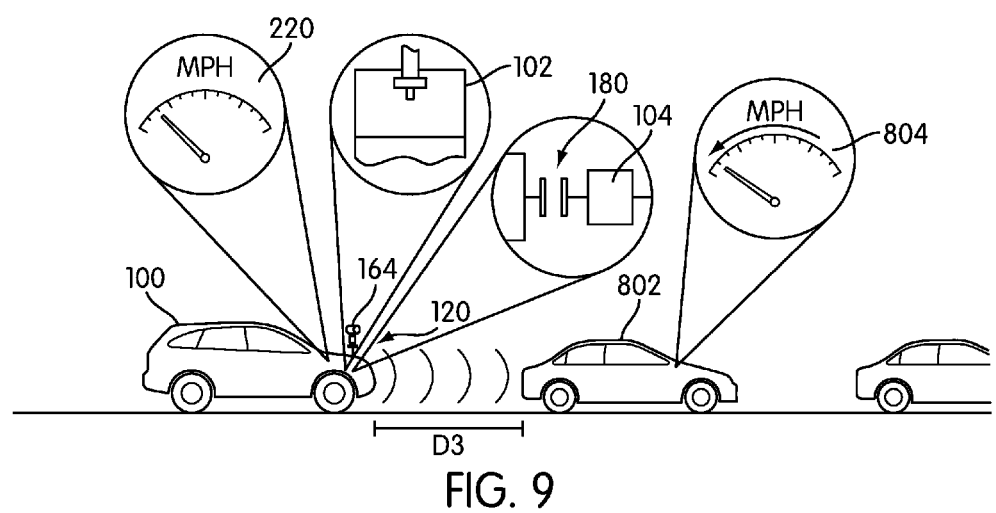
FIG. 9 is a schematic view of an embodiment of a motor vehicle traveling behind a decelerating preceding vehicle.

FIGS. 8 and 9 show an embodiment of the operation of control system 120. Referring to FIG. 8, motor vehicle 100 is traveling behind preceding vehicle 802. In this case, motor vehicle 100 is traveling at a relatively low speed (as indicated by speedometer 220) and within a relatively short distance D3 of preceding vehicle 802. However, control system 120 detects that preceding vehicle 802 is traveling at a relatively high speed, as indicated by speedometer 804. Therefore, control system 120 determines that motor vehicle 100 is not likely to stop and continues to operate engine 102 to provide power. While engine 102 remains on, clutch assembly 180 is kept in the engaged state to provide torque transfer from engine 102 to motor 104.

Referring now to FIG. 9, as preceding vehicle 802 begins to slow down, the sudden deceleration is detected by motor vehicle 100. In addition, the speed of motor vehicle 100 is below a threshold speed and the following distance D3 is below a threshold following distance. Therefore, control system 120 determines that there is a high probability of motor vehicle 100 stopping. At this point, control system 120 shuts down engine 102 in order to conserve fuel and reduce emissions. Also, as engine 102 is shut down, control system 120 may operate clutch assembly 180 is a disengaged state to reduce pumping losses by engine 102. With this arrangement, the shut down period of engine 102 may be extended beyond the time when motor vehicle 100 is stopped.

Figure 10:
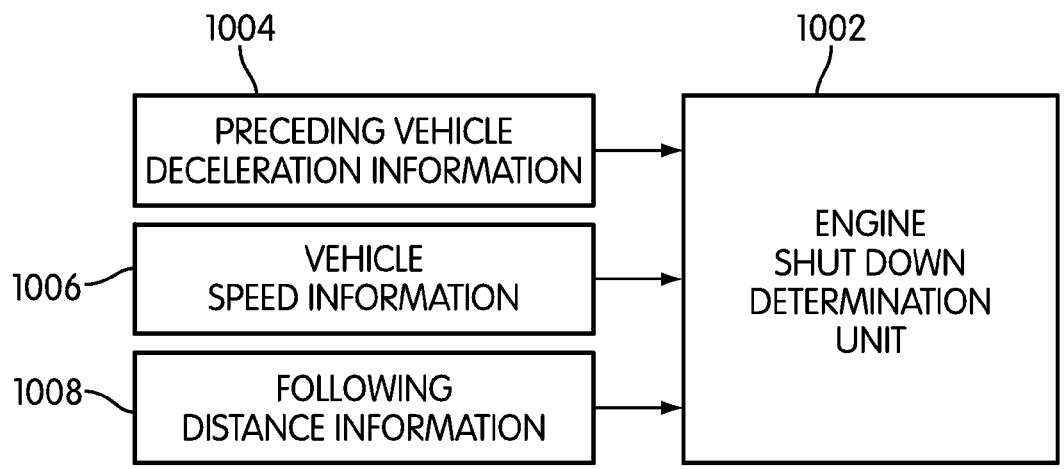
FIG. 10 is a schematic view of an embodiment of an engine shut down determination unit.

FIG. 10 illustrates a schematic view of an exemplary embodiment of engine shut down determination unit 1002. Engine shut down determination unit 1002 may be any process or set of processes associated with control system 120 that are used to determine when engine 102 should be shut down. In some cases, engine shut down determination unit 1002 may be associated with ECU 150. In other cases, engine shut down determination unit 1002 may be associated with any other electronic control units in motor vehicle 100.

Engine shut down determination unit 1002 may receive one or more inputs. In the current example, preceding vehicle deceleration information 1004, vehicle speed information 1006 and following distance information 1008 may be supplied as inputs to engine shut down determination unit 1002. As previously discussed, preceding vehicle deceleration information 1004 and/or following distance information 1008 can be determined from a radar sensor, camera, lidar or other remote sensing devices or technology. Vehicle speed information 1006 can be received from any kind of speed sensor. In an exemplary embodiment, control system 120 determines if a motor vehicle may be stopping soon by considering preceding vehicle deceleration information, vehicle speed information and following distance information. Details of this method of determining if a vehicle is going to stop are discussed in detail below.

Although the current embodiment uses three input parameters to determine if a motor vehicle is going to stop, other embodiments can use any number of inputs. For example, in some cases, a single input could be used. In other cases, two or more inputs could be used. In still other cases, four or more inputs could be used. Furthermore, in other embodiments other operating parameters of a motor vehicle or a preceding vehicle could be used to determine when a motor vehicle is going to stop. As an example, in an alternative embodiment, a control system may use information about the speed of a preceding vehicle to determine if a motor vehicle is going to stop.

Figure 11:
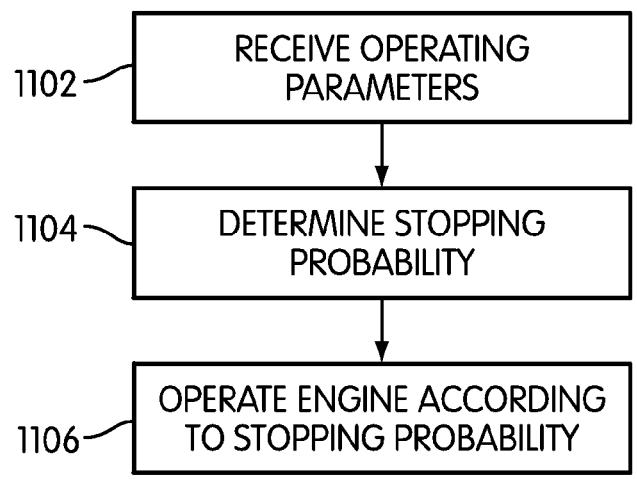
FIG. 11 is an embodiment of a process of operating an engine.

FIG. 11 illustrates an embodiment of a process for controlling an engine in a motor vehicle. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 1102, control system 120 may receive operating parameters associated with motor vehicle 100 as well as with a preceding vehicle. For example, in the current embodiment, control system 120 may receive preceding vehicle deceleration information, vehicle speed information for motor vehicle 100 and following distance information. This information can be received from one or more sensors as discussed above.

Next, during step 1104, control system 120 may determine the probability that motor vehicle 100 is going to stop. In an exemplary embodiment, control system 120 could determine that either motor vehicle 100 is going to stop or that motor vehicle 100 is not going to stop. In other words, during step 1104, control system 120 may simply determine if it is true or false that motor vehicle 100 is going to stop. However, in other embodiments, control system 120 could estimate a stopping probability in a range between 0 and 100 percent.

Following step 1104, during step 1106, control system 120 may operate engine 102 according to the information determined during the previous step. In particular, if control system 120 determines that motor vehicle 100 is going to stop during step 1104, control system 120 may shut down engine 102. If, however, control system 120 determines that motor vehicle 100 is not going to stop during step 1104, control system 120 may keep operating engine 102 to generate power for motor vehicle 100.

Figure 12:
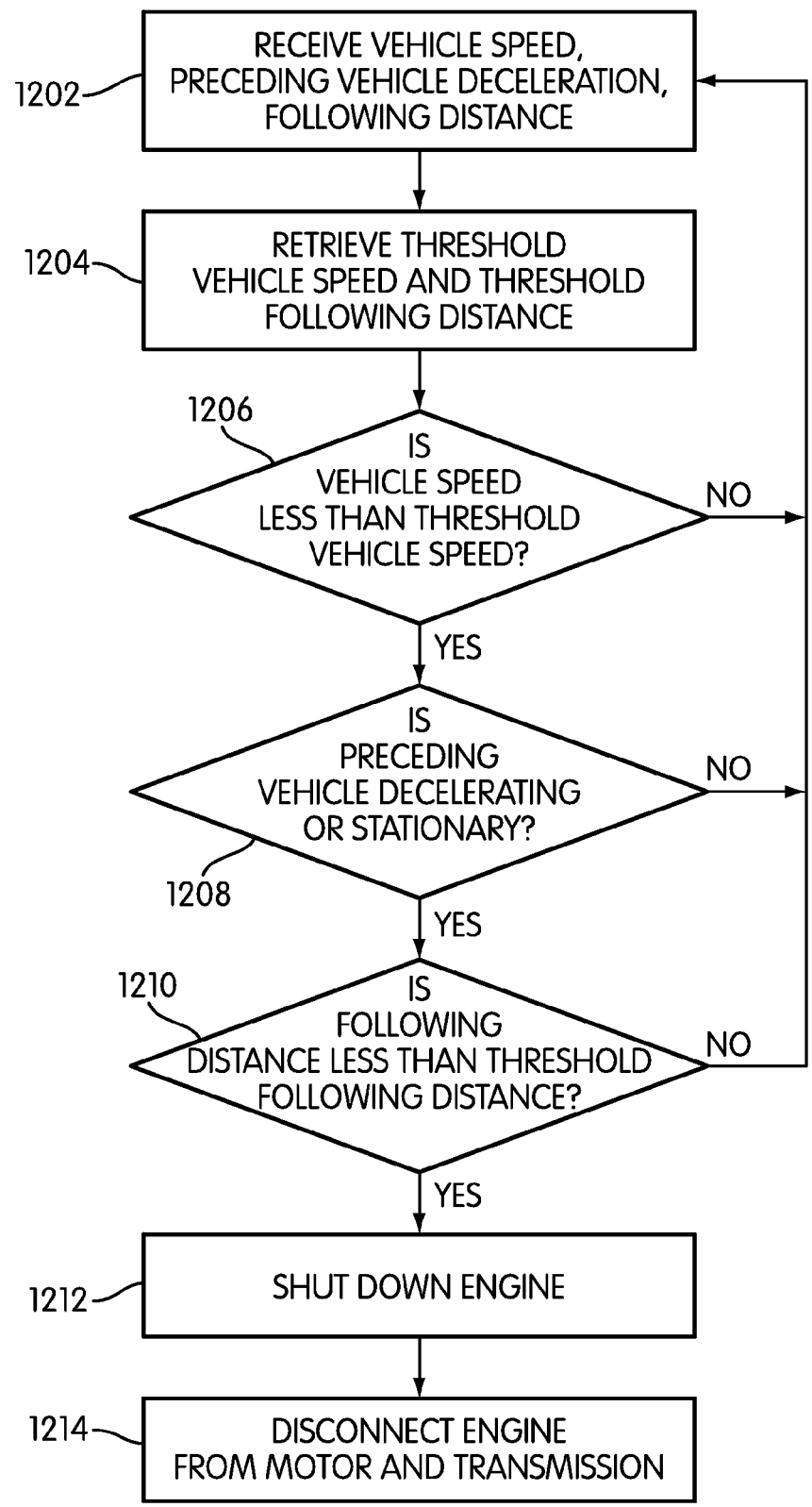
FIG. 12 is an embodiment of a detailed process of operating an engine.

FIG. 12 illustrates an embodiment of a detailed process for controlling an engine in a motor vehicle. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 1202, control system 120 may receive vehicle speed information, preceding vehicle deceleration information and following distance information. In the current embodiment, preceding vehicle deceleration information may also include any information about whether the preceding vehicle is stationary.

Next, during step 1204, control system 120 may retrieve a threshold vehicle speed and a threshold following distance. Generally, the threshold vehicle speed can have any value. In some cases, the threshold vehicle speed may vary in the range between 0 and 30 miles per hour. In other cases, the threshold vehicle speed may vary in the range between 0 and 20 miles per hour. In an exemplary embodiment, the threshold vehicle speed may be approximately 20 miles per hour.

Generally, the threshold following distance can have any value. In some cases, the threshold following distance may vary in the range between 0 and 200 feet. In other cases, the threshold following distance may vary in the range between 0 and 100 feet. In still other cases, the threshold following distance may vary in the range between 0 and 50 feet. In still other cases, the threshold following distance may be greater than 200 feet.

Following step 1204, during step 1206, control system 120 may determine if the vehicle speed is less than the threshold vehicle speed. If the vehicle speed is greater than the threshold vehicle speed, control system 120 may return to step 1202 to receive new information. Otherwise, if the vehicle speed is less than or equal to the threshold vehicle speed, control system 120 may proceed to step 1208.

During step 1208, control system 120 may determine if the preceding vehicle is decelerating or stationary. If the preceding vehicle is not decelerating or is not stationary, control system 120 may return to step 1202. Otherwise, control system 120 may proceed to step 1210. During step 1210, control system 120 may determine if the following distance is less than the threshold following distance. If the following distance is greater than the threshold following distance, control system 120 may return to step 1202. Otherwise, if the following distance is less than or equal to the threshold following distance, control system 120 may proceed to step 1212.

During step 1212, control system 120 may shut down engine 102. In other words, during step 1212, control system 120 determines that motor vehicle 100 is going to stop and shuts down engine 102 early to conserve additional fuel and reduce emissions. Following step 1212, control system 120 may proceed to step 1214. During step 1214, control system 120 may disconnect engine 102 and motor 104. In some cases, control system 120 may disengage clutch assembly 180 to disconnect engine 102 and motor 104. This helps to improve fuel efficiency by reducing energy losses that would occur by pumping air through engine 102.

A control system can include provisions for shutting down an engine in some situations where a vehicle is not within a threshold following distance of a preceding vehicle. For example, in situations where a preceding vehicle continues to decelerate for a predetermined amount of time, a control system may determine that the preceding vehicle is going to stop soon and therefore the motor vehicle will also likely stop soon. This can be determined even before the motor vehicle is within the threshold following distance of the preceding vehicle. In an exemplary embodiment, a control system may shut down an engine whenever a vehicle is traveling below a threshold vehicle speed and a preceding vehicle has been decelerating for more than a predetermined period.

Figure 13:
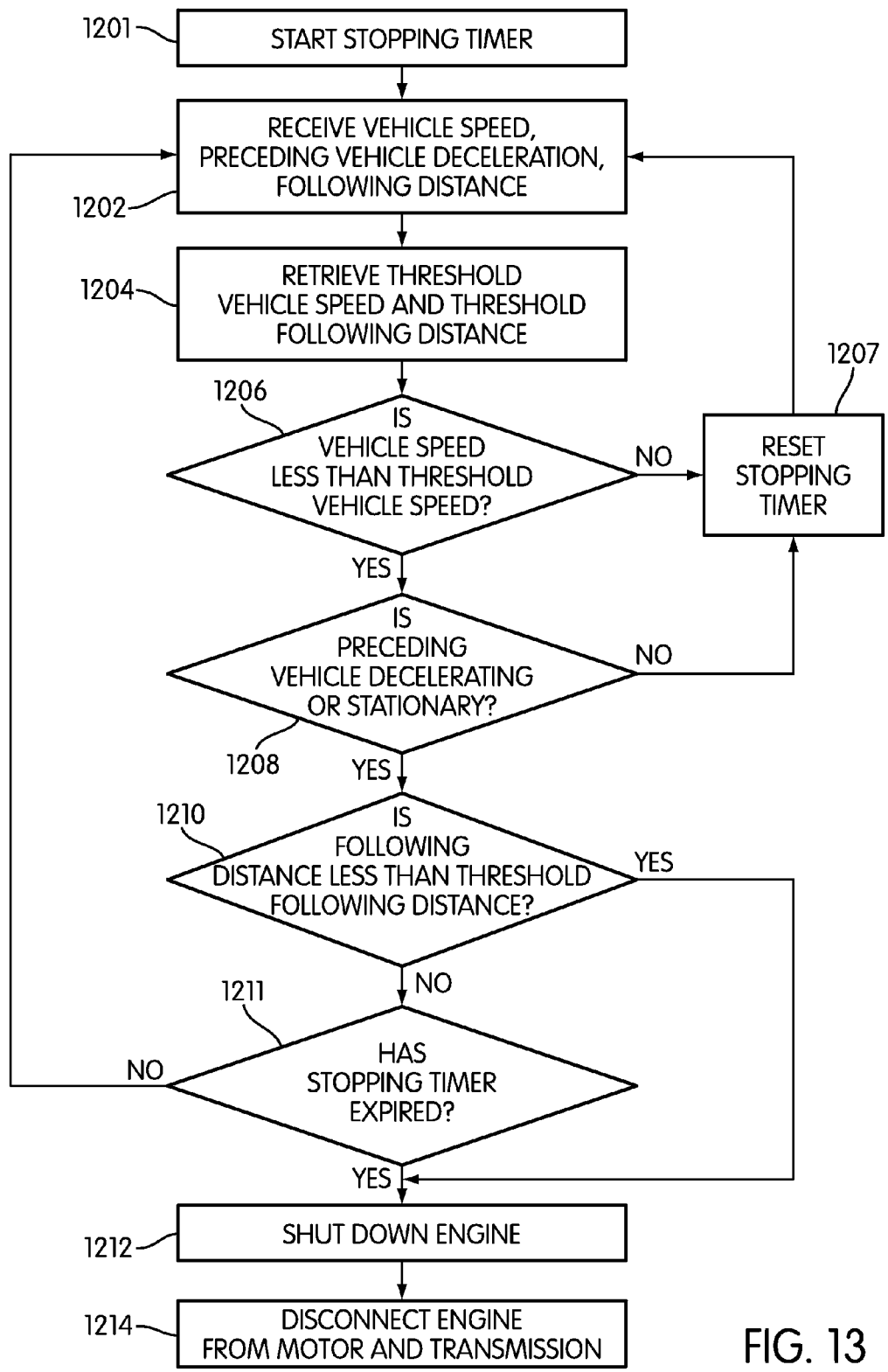
FIG. 13 is another embodiment of a detailed process of operating an engine.

FIG. 13 illustrates an alternative embodiment of a detailed process for controlling an engine in a motor vehicle. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 1201, control system 120 may start a stopping timer. The stopping timer is a timer that counts down as long as a vehicle is traveling at a speed below the threshold vehicle speed and the preceding vehicle is decelerating or stationary. If at any point the vehicle speed rises above the threshold vehicle speed or the preceding vehicle begins to accelerate or travel at a constant velocity, the stopping timer is reset. When the stopping timer expires, control system 120 may shut down the engine without waiting for the motor vehicle to get within the threshold following distance of the preceding vehicle.

Generally, a stopping timer can be any kind of timer known in the art. A stopping timer may be associated with ECU 150 or any other components of motor vehicle 100. In some cases, a stopping timer could count down from a predetermined time period. The predetermined time period could have any value. In some cases, a predetermined period may be set by a manufacturer. In other cases, the predetermined time period could vary according to another parameter. Moreover, in other embodiments, a stopping timer may not count down in seconds, but could keep track of the number of steps that have occurred in the process since the stopping timer was last reset.

In the current process, step 1202 and step 1204 proceed as discussed above. Following step 1204, control system 120 proceeds to step 1206. During step 1206, control system 120 may determine if the vehicle speed is less than the threshold vehicle speed. If the vehicle speed is greater than the threshold vehicle speed, control system 120 may proceed to step 1207, otherwise control system 120 may continue to step 1208. During step 1207, control system 120 may reset the stopping timer. Following step 1207, control system 120 returns to step 1202 to receive new information.

During step 1208, control system 120 may determine if the preceding vehicle is decelerating or stationary. If the preceding vehicle is not decelerating or if the preceding vehicle is not stationary, control system 120 may proceed to step 1207 where the stopping timer is reset. Otherwise, control system 120 may proceed to step 1210.

During step 1210, control system 120 determines if the following distance is less than the threshold following distance. If the following distance is less than the threshold following distance, control system 120 proceeds to step 1212 to shut down the engine. Otherwise, if the following distance is greater than the threshold following distance, control system 120 proceeds to step 1211.

During step 1211, control system 120 determines if the stopping timer has expired. If not, control system 120 returns to step 1202. If the stopping timer has expired, control system 120 proceeds to step 1212. During step 1212 the engine is shut down. During step 1214, control system 120 may disconnect engine 102 and motor 104. In some cases, control system 120 may disengage clutch assembly 180 to disconnect engine 102 and motor 104. This helps to improve fuel efficiency by reducing energy losses that would occur by pumping air through engine 102. This arrangement allows the engine to be shut down in situations where a preceding vehicle has been decelerating for more than a predetermined period of time.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of operating a motor vehicle including an engine, comprising the steps of:
   receiving vehicle speed information for the motor vehicle;
   receiving information related to a preceding vehicle, the preceding vehicle disposed approximately in front of the motor vehicle;
   determining whether the motor vehicle is going to stop using the information about the preceding vehicle and the vehicle speed information;
   wherein the step of determining whether the motor vehicle is going to stop further comprises the steps of:
   determining whether a distance between the motor vehicle and the preceding vehicle is less than a threshold distance;
   determining whether the vehicle speed information for the motor vehicle is below a threshold speed;
   wherein when the distance is less than the threshold distance and the vehicle speed information is below the threshold speed, determining that the motor vehicle is going to stop; and
   controlling the engine to shut down before the motor vehicle stops, when determined that the motor vehicle is going to stop.

2. The method according to claim 1, wherein the vehicle speed information is received from a vehicle speed sensor.

3. The method according to claim 1, wherein the vehicle speed information is determined using information from a GPS system.

4. The method according to claim 1, wherein the information related to the preceding vehicle includes deceleration information.

5. The method according to claim 1, wherein the information related to the preceding vehicle is used to determine if the preceding vehicle is stationary.

6. The method according to claim 4, wherein the information related to the preceding vehicle is determined using a remote sensing device.

7. The method according to claim 6, wherein the remote sensing device is a camera.

8. The method according to claim 6, wherein the remote sensing device is a radar device.

9. The method according to claim 6, wherein the remote sensing device is a lidar device.

10. A method of operating a motor vehicle including an engine, comprising the steps of:
    determining a following distance to a preceding vehicle;
    retrieving a threshold following distance;
    determining a vehicle speed of the motor vehicle;
    retrieving a threshold vehicle speed; and
    controlling the engine to shut down upon determining that:
    (a) the following distance is less than the threshold following distance and (b) the vehicle speed is greater than zero and less than the threshold vehicle speed.

11. The method according to claim 10, wherein the method includes a step of receiving preceding vehicle deceleration information.

12. The method according to claim 11, wherein the engine is prevented from shutting down when the preceding vehicle is accelerating or traveling at a constant speed.

13. The method according to claim 10, wherein threshold vehicle speed is approximately 20 miles per hour.

14. A method of operating a motor vehicle including an engine, comprising the steps of:
    receiving information related to a preceding vehicle;
    determining a vehicle speed of the motor vehicle;
    retrieving a threshold vehicle speed;
    determining if the preceding vehicle is decelerating; and
    controlling the engine to shut down upon determining that:
    (a) the vehicle speed is greater than zero and less than the threshold vehicle speed and (b) the preceding vehicle is decelerating.

15. The method according to claim 14, wherein the step of determining if the preceding vehicle is decelerating includes a step of determining if the preceding vehicle is stationary.

16. The method according to claim 15, wherein the step of controlling the engine to shut down is followed by a step of controlling the engine to shut down when the vehicle speed is less than the threshold vehicle speed and when the preceding vehicle is stationary.

17. The method according to claim 14, wherein the step of receiving information related to the preceding vehicle is followed by a step of determining a following distance between the motor vehicle and the preceding vehicle.

18. The method according to claim 17, wherein the step of determining the following distance is followed by a step of retrieving a threshold following distance.

19. The method according to claim 18, wherein the step of controlling the engine to shut down is followed by a step of preventing the engine from shutting down when the following distance is greater than the threshold following distance.

20. The method according to claim 14, wherein the step of controlling the engine to shut down is followed by a step of disconnecting the engine from a motor, the motor being configured to store energy delivered from one or more wheels.

* * * * *